Sept. 26, 1944. J. M. WALTER 2,358,896
HORIZONTAL TYPE BORING, DRILLING, AND MILLING MACHINE
Filed June 19, 1942 5 Sheets-Sheet 1
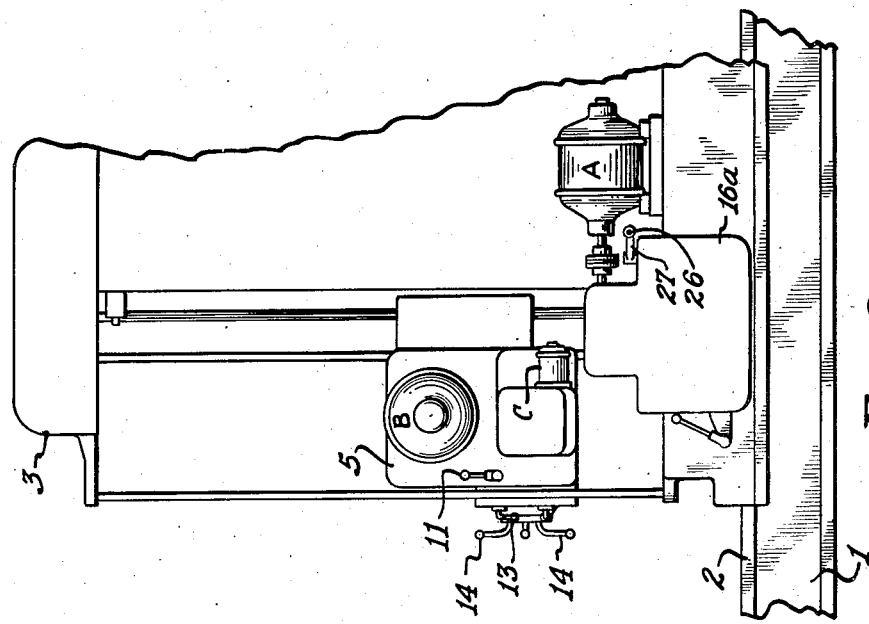
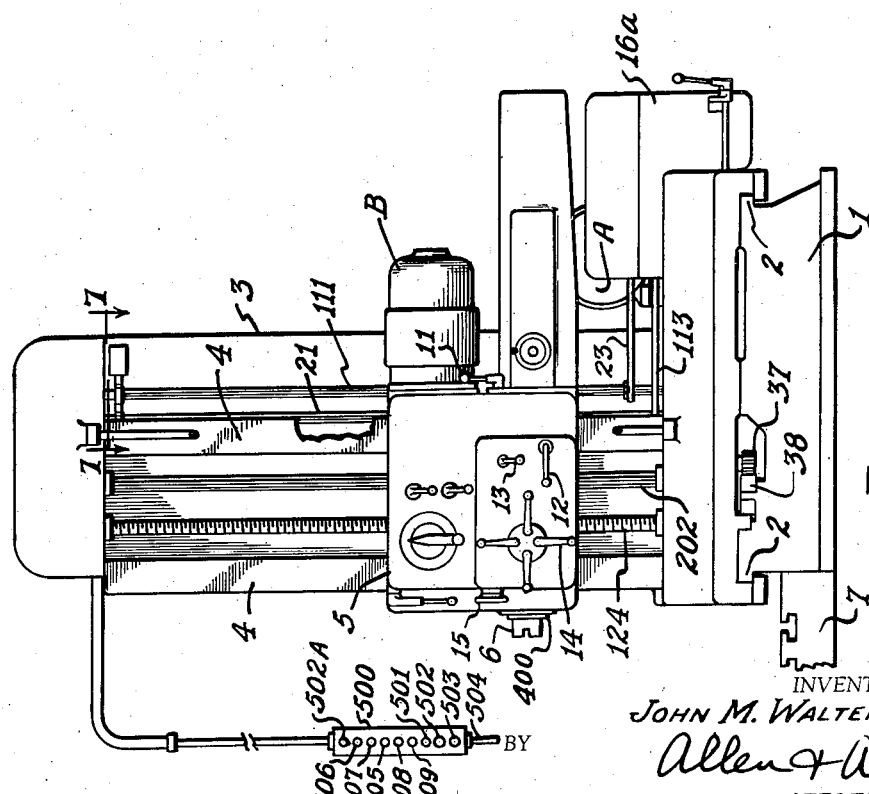
INVENTOR.
JOHN M. WALTER.
BY Allen & Allen
ATTORNEYS.

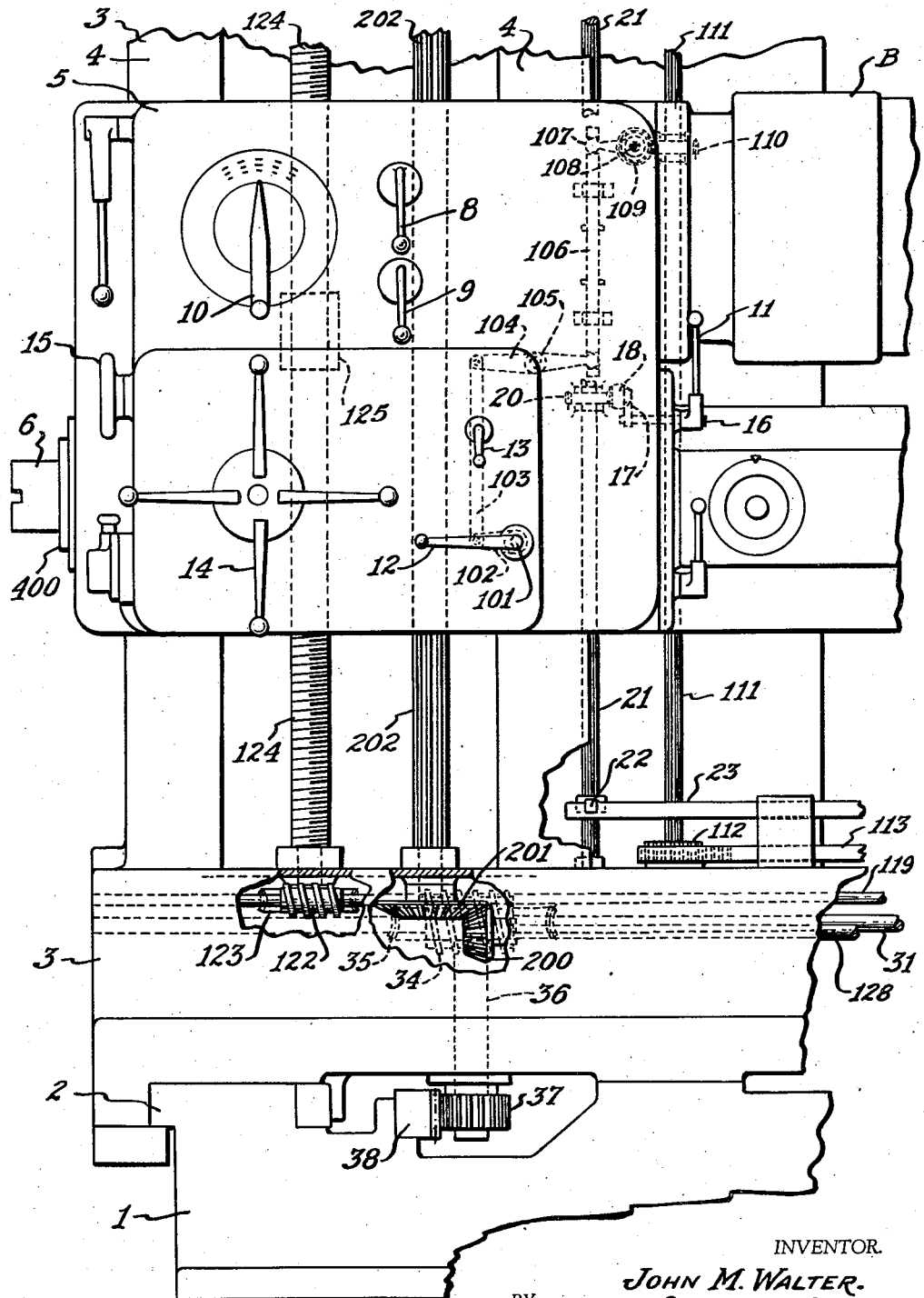

Sept. 26, 1944.   J. M. WALTER   2,358,896
HORIZONTAL TYPE BORING, DRILLING, AND MILLING MACHINE
Filed June 19, 1942   5 Sheets-Sheet 3

INVENTOR.
JOHN M. WALTER.
BY
Allen & Allen
ATTORNEYS.

Sept. 26, 1944. J. M. WALTER 2,358,896
HORIZONTAL TYPE BORING, DRILLING, AND MILLING MACHINE
Filed June 19, 1942 5 Sheets-Sheet 4
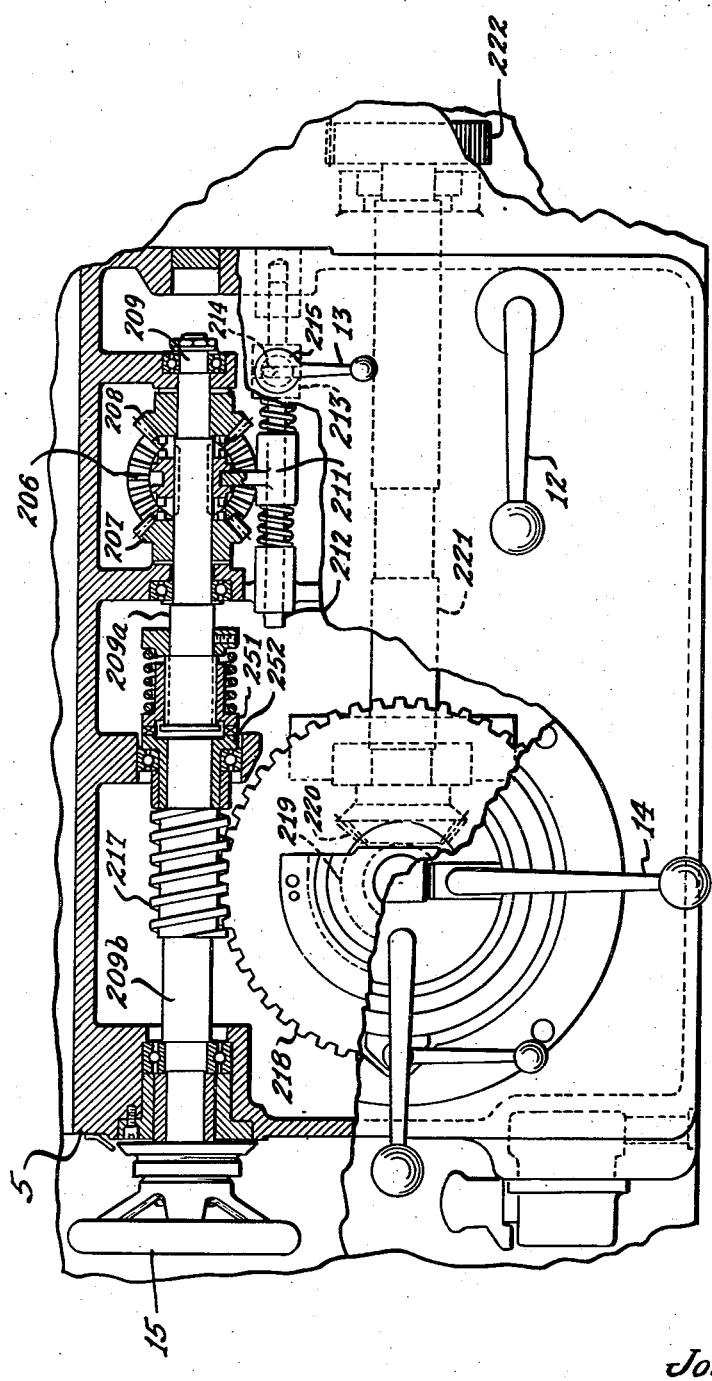
INVENTOR.
JOHN M. WALTER.
BY Allen & Allen
ATTORNEYS.

Sept. 26, 1944.  J. M. WALTER  2,358,896
HORIZONTAL TYPE BORING, DRILLING, AND MILLING MACHINE
Filed June 19, 1942  5 Sheets-Sheet 5
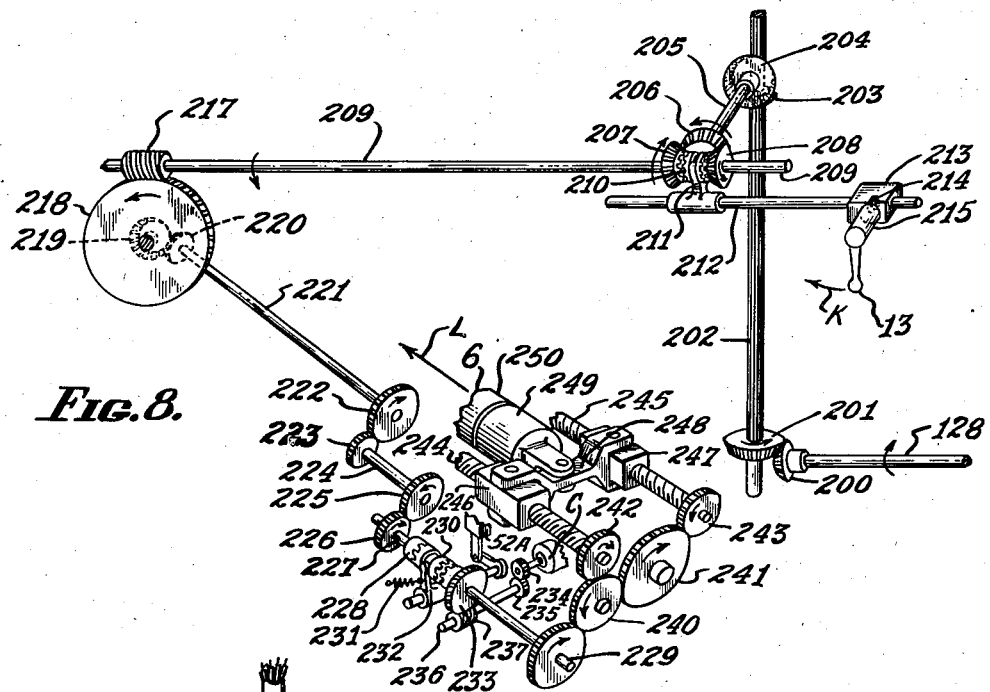
INVENTOR.
JOHN M. WALTER.
BY Allen & Allen
ATTORNEYS.

Patented Sept. 26, 1944

2,358,896

UNITED STATES PATENT OFFICE 2,358,896

HORIZONTAL TYPE BORING, DRILLING, AND MILLING MACHINE

John M. Walter, Cincinnati, Ohio, assignor to The G. A. Gray Company, Cincinnati, Ohio, a corporation of Ohio Application June 19, 1942, Serial No. 447,680

1 Claim. (Cl. 29—26)

My invention relates more particularly to horizontal type boring, drilling and milling machines, with reference to which I have filed certain companion applications for patent, Serial No. 435,699, filed March 21, 1942, now Patent No. 2,307,975, dated January 12, 1943, Serial No. 439,-866, filed April 21, 1942, and Serial No. 442,468, filed May 11, 1942.

The above applications for patent show a cross feed for the housing or column of a machine such as above indicated in addition to a lengthwise feed along the ways of the machine bed. They also show a spindle feed for moving the tool spindle axially. And finally they show a structure whereby the housing or column may be "inched" or jogged into exact locations on the ways.

In the present application it is my object to provide for a feed control for various movements of the tool carrying parts of the machine, including the lengthwise and crosswise feed of the housing or column, the feed of the spindle carrying head up and down the column, and the feed of the spindle axially in addition to its rotary motion. In this connection the point of the invention is to make the controls foolproof and very simple to operate as well as easy to learn to operate. The switch buttons are arranged, preferably, on a single pendant switch button support, and the control levers for clutching the drives for the various movements are arranged so that they will by their own direction of movement correspond to the direction of movement which will be imparted to the selected part. Thus if the selected part is to move to the right, the control lever thereof will be swung to the right, and if the selected part is to bemoved to the left, the same control lever will be moved to the left. An operator subconsciously will so operate the levers, wherefore the machine is easy and natural to operate in spite of the rather extreme complication of movements which might readily baffle the inexperienced operator.

I have shown but a single example in my drawings using simple clutching arrangements for operation by the control levers, which are connected up by mechanical trains with the clutches. It will be understood that this is exemplary of my invention and that I am not to be limited to the particular mechanical trains or clutching arrangements, since what my invention is directed to is an organization of drives and controls which will have certain directional requirements, as above indicated. I hereby refer to the claim which follows as an expression of the inventive features of the disclosure and distinctly do not disclaim power connections as distinguished from mechanical trains of connecting gears, levers, racks, pinions, etc.

In the drawings:

Figure 1 is a front elevation showing a horizontal type boring, drilling and milling machine embodying my invention.

Fig. 2 is an elevational view taken from the right side of Figure 1.

Fig. 3 is a view in front elevation, being a fragmentary portion of Figure 1 but enlarged to snow additional detail.

Fig. 6 is a fragmentary and enlarged front elevation showing in detail certain elements of the spindle feed control, parts being broken away and other parts being shown in section.

Fig. 7 is a fragmentary sectional view taken along the line 7—7 of Figure 1 illustrating an interlocking device which may be employed.

Fig. 8 is a diagrammatic perspective illustrating the spindle feed control system.

Fig. 9 is a front elevation showing the upper portion of the pendant switch, and Fig. 10 is a continuation of Figure 9, showing the lower portion of the pendant switch.

Figure 4:
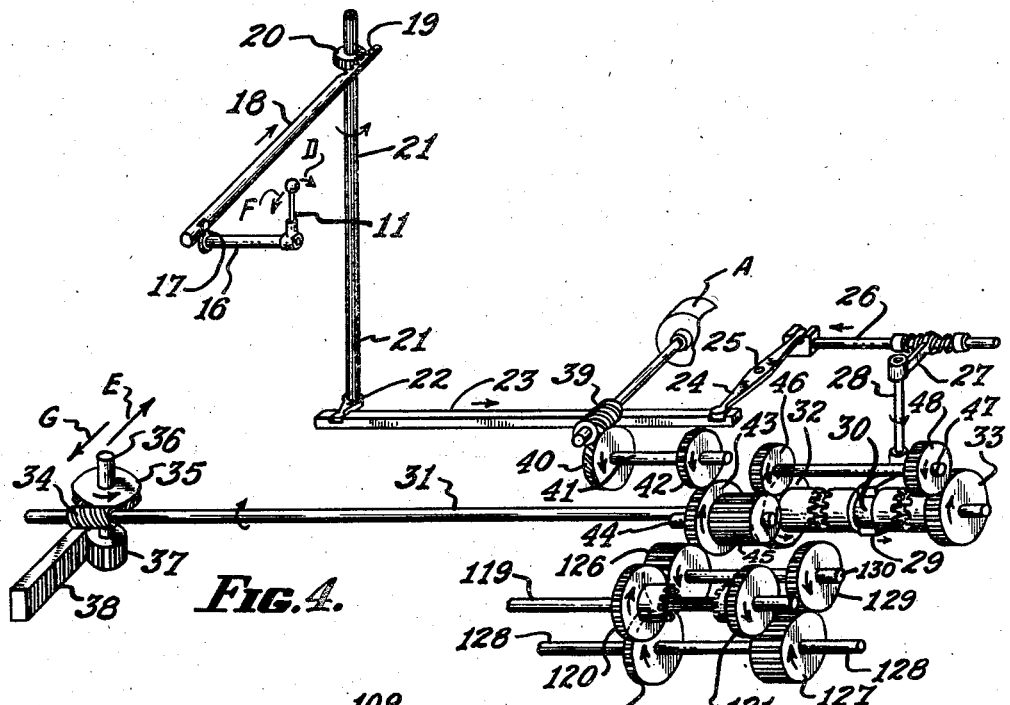
Fig. 4 is a diagrammatic perspective showing an arrangement of drive gears and the train of levers and drive members for controlling movement of the column on the runway.

Referring to Figures 1 and 2, the machine comprises a base member or runway 1 having ways 2, 2 upon which is slidably mounted the column 3. Slidably mounted for vertical movement upon ways 4, 4 of the column is the head 5 which carries the spindle 6, the spindle being suitably formed to accommodate various tools as required and being suitably journaled to permit feeding movement to and from the work, which work will usually be clamped to a work base or other suitable holding device indicated at 7.

A motor A provides power for movement of the column 3 along the base or runway 1; for the vertical movement of the head 5 upon the column 3 and for normal feed motion of the spindle 6 to or from the work, all of which movements may be individually and directionally controlled by operation of certain control levers to be described, the motor A being controlled therewith by push button stations as may be embodied in a pendant switch 500.

The spindle 6 is rotated or driven by a motor B which operates through various selective speed change gears contained in the head 5, the engagement of the gears and consequently the speed of rotation of the spindle being controlled by the levers 8, 9 and 10, and the starting and stopping operations of the motor B being controlled by certain push button stations as may be embodied in the pendant switch. An arrangement of drive mechanism for transmitting power from motor B to the spindle 6 is fully described in my Patent No. 2,215,627, issued September 24, 1940, to which patent reference is hereby made.

Movement of the column 3 along the runway 1 occurs when a control lever 11, which is shown throughout the drawings in neutral position, is shifted in the direction of travel required, the motor A being thereafter energized by depression of the proper push button of the pendant switch. Thus if the lever is moved to the right as seen in Fig. 2, the drive members involved will be engaged so that movement of the column upon the runway will be to the right. If the lever is shifted to the left the resulting engagement of the drive members will cause the column to travel to the left, upon energization of the motor A.

As seen in Figure 1, a lever 12 controls the directional movement of the head 5 with respect to the column 3. This lever is shown in neutral position, whereby no engagement of the drive members is effected and no movement of the head will occur, but if shifted upward a train of gears and drive members will be engaged which will cause the head to be moved upward whenever the motor A is energized. If shifted downward the travel of the head will be downward, due to the arrangement of the drive members involved.

The spindle feed or its normal slow rate of in and out motion with respect to the work is, as previously mentioned, derived from the motor A, the direction of travel being controlled by a lever 13, which is shown in neutral position in Figure 1. If this lever is shifted to the left, the resulting feed motion of the spindle will be to the left and if shifted to the right the resulting feed motion of the spindle will be to the right. Auxiliary means for manually advancing or retracting the spindle may, of course, be readily provided, and I have shown a spider 14 and a hand wheel 15 by means of which the spindle may be manually advanced or retracted as desired during operations of setting up the machine to perform various operations. Rapid traverse of the spindle may be produced by power of a motor C, which is shown in Fig. 2, the engagement of this motor to the spindle feed mechanism being controlled entirely by actuation of certain push button stations such as may be embodied in the pendant switch 500. The detailed arrangement of motor C and the arrangement of certain other features of the spindle feed mechanism are disclosed in my copending application, Serial No. 435,699, filed March 21, 1942, now Patent No. 2,307,975, dated January 12, 1943, to which application reference is hereby made.

The column 3 carries thereon the motor A and a gear box 16ᵃ which gear box contains various gears and drive members driven by motor A, the detailed arrangement of which gears and drive members in conjunction with the detailed arrangement of the control members actuated by the levers 11, 12 and 13, will be disclosed as the description proceeds and as required for understanding of my invention.

From the foregoing it will be understood that the control levers 11, 12 and 13 are directional in effect, and that the speed or rate of movement, as well as the starting and stopping operations, of the column, head and spindle, is controlled by push button stations such as may be contained in the pendant switch 500 or at other convenient locations.

*Column drive on runway*

The lever 11, which controls engagement of the column drive mechanism, is mounted for convenience of the operator upon the head 5 and it will be understood that various other mountings or locations of this lever, as well as that of any other control lever described in this application, may be readily devised without departing from my invention.

Referring to Figs. 2, 3 and 4, the lever 11 is mounted upon a shaft 16 suitably journaled in the head 5. The shaft 16 may have at its outer end a lever arm 17 engaging a rod 18 which is slidably mounted in the head 5 and is formed at its other end with a rack portion 19 which engages a spur gear 20. A suitable yoke formed in the head 5, retains the gear 20 in operative relation with the head but the gear is slidably mounted with respect to a vertical splined shaft 21 which is journaled at its upper and lower ends in the column 5. Near the lower end of the shaft 21 is affixed a lever arm 22 which engages a bar 23 slidably mounted for longitudinal movement in the lower portion of the column. The outer end of the bar 23 engages a double lever 24 which is pivoted at 25, the other end of the lever being pivotally connected to a rod 26. The rod 26 engages a lever 27 fixed on shaft 28 which has at its lower end a clutch fork 29. (Fig. 4.)

The clutch fork 29 operates a double clutch element 30 which is slidably keyed or splined on a portion of a long shaft 31. Arranged to rotate freely on the shaft 31 are a pair of oppositely driven gears 32 and 33 which have hubs provided with clutch teeth. The clutch element 30, when shifted from its neutral position as shown, will engage the clutch teeth on the hub of either gear to drive shaft 31 in the direction of rotation of the gear. The clutch element 30 and the gears 32 and 33 thus provide a reversible drive for the shaft 31, the engagement of the clutch being controlled by actuation of the lever 11.

The shaft 31 is journaled in the lower portion of the column and carries a worm 34 which drives a worm gear 35 fixed on a shaft 36, which is also journaled in the column, but which is vertically mounted and has at its lower end a spur gear 37, which engages a rack 38 fixed in the base or runway of the machine. Thus when the gear 37 is rotated the column will be moved along the runway by power supplied by the motor A. The motor A is mounted on the column 3 and has affixed to its shaft a worm 39 which drives the worm gear 40 on shaft 41, which shaft carries a gear 42 meshing with a gear 43 on a stub shaft 44, and having affixed therewith a gear 45 of double width to engage the clutch gear 32 previously mentioned, and another gear 46. The gear 46 is fixed on a shaft 47 having another gear 48 which drives the clutch gear 33 in reverse rotation to that imparted to the gear 32. It will now be clear how the motor A, acting through the drive members described, causes the column to be traversed along the runway by virtue of the gear 37, which is carried in the column, engaging the rack 38, which is fixed to the runway. It will also be clear that the travel of the column upon the runway will be in the same direction as that in which the control lever 11 is moved by the operator.

In Fig. 4, I have indicated directional movement of the lever 11 by an arrow D. Throughout the diagram I have indicated by other arrows the resulting movement of members involved. By inspection of the diagram it will be apparent that the result produced will be to move the column (in which the shaft 36 is mounted) in the direction indicated by the arrow E, which direction corresponds to that of arrow D. By moving the lever 11 in the direction of arrow F, the engagement of the clutch 30 will be such as to result in movement of the column in the direction of arrow G.

Head drive on column

Figure 5:
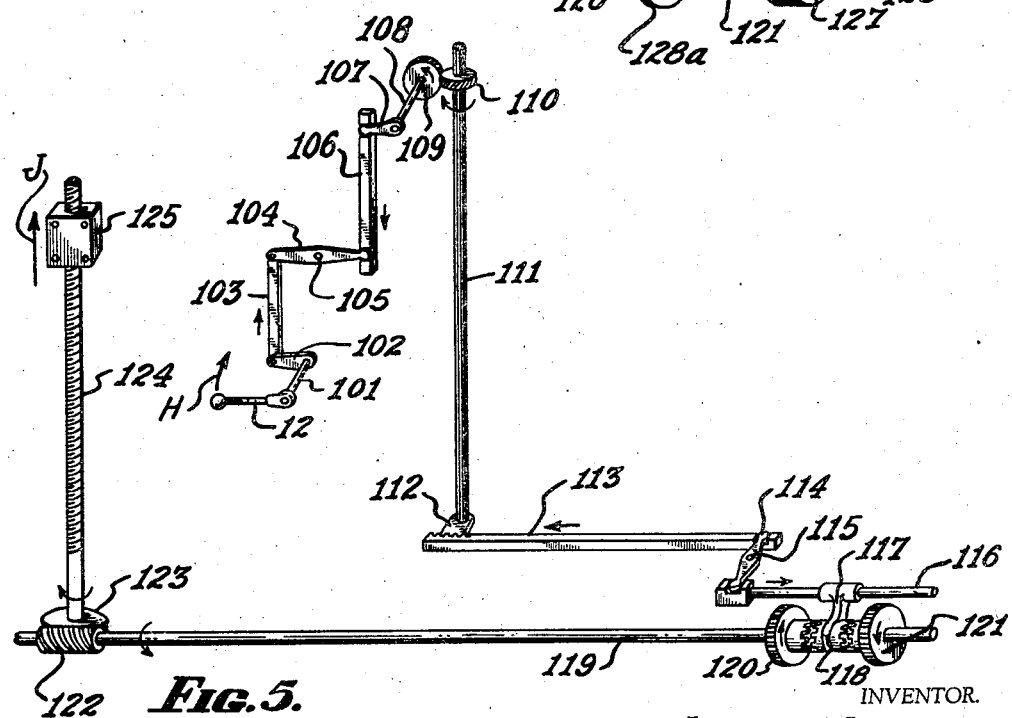
Fig. 5 is a diagrammatic perspective showing the train of levers and drive members for controlling vertical movement of the head upon the column.

Referring to Figs. 3 and 5, the head drive mechanism is controlled by a lever 12 which is fixed on a shaft 101 journaled in the head and having at its other end a lever 102 to which is attached a rod 103 pivotally affixed at its upper end to a double lever 104 which is pivotally mounted at 105 and engages at its other end a bar 106, which bar is slidably mounted in the head. The bar 106 engages a lever 107 fixed on a shaft 108 which is also journaled in the head but which extends rearward, and has affixed a spiral gear 109 which has a mate 110 mounted on a splined shaft 111. The gear 110 is slidable along the shaft 111 and is retained in proper operating relation with the gear 109 by a suitable yoke construction of the head, so that when the head travels up or down the gear 110 is moved along in proper operative relation to the head and the splined shaft 111.

The shaft 111 is journaled at its upper and lower ends in the column 3 and has at its lower end a gear sector 112 which engages a rack portion of a slidably mounted bar 113. The bar 113 is suitably mounted in the base of the column and engages a double lever 114, which lever is pivoted at 115 and at its other end engages a clutch operating rod 116. By the arrangement shown it will be apparent that movement of the lever 12 will result in movement of the rod 116, which rod carries the clutch shifting fork 117 engaging a double clutch element 118. The clutch element 118 is splined or slidably keyed to a long shaft 119 having a pair of gears 120 and 121 freely mounted thereon and driven in opposite directions of rotation, as will presently be described. The gears 120 and 121 each have hubs with clutch teeth facing the element 118 so that by shifting the element 118 either of the gears may be engaged to drive shaft 119 in either direction of rotation. The shaft 119 is provided with suitable bearings in the lower portion of the column and has near its other end a worm 122 which engages and drives a gear 123 fixed on the vertical feed screw 124. The feed screw 124 is journaled in the column 3 and is engaged by a nut 125 carried by the head 5. The drive means for gears 120 and 121 is illustrated in Fig. 4. As here shown the gear 43, before described, meshes with a double width gear 126, which drives the gear 120 in the direction indicated. The gear 121 is driven in reverse relation by a gear 127 which is freely mounted on a shaft 128, the gear 127 being driven by a gear 129 fixed on a shaft 130 with the gear 126 just above referred to, and driven by the gear 43.

From the arrangement shown and described it will now be clear that the head control lever 12 is directional in effect. Thus if the lever is shifted upward as indicated by the arrow H, the resulting motions of the members involved will be as indicated by the small arrows throughout the figure and movement of the head will be upward as indicated by the arrow J. If the lever is shifted downward, the engagement of the clutch will be such that the head travels downward, whenever the drive motor A is energized.

Spindle feed

As diagrammatically illustrated in Fig. 8, the shaft 128, which is driven by gear 128a from gear 126 (Fig. 4), and which is suitably journaled in the lower portion of the column, has affixed thereto a miter gear 200, which drives a mate 201 fixed on a vertical splined shaft 202. The shaft 202 is journaled at its upper and lower ends in the column and has a slidably mounted bevel gear 203, meshing with a larger bevel gear 204, which is in turn fixed on a shaft 205, journaled in the head. By a yoke arrangement, integral with the head 6, the gear 203 is held in operative relation with the gear 204, so that as the head is raised or lowered, the gear 203 slides along the shaft 202 and transmits motion thereof to the shaft 205.

At its forward end the shaft 205 carries a bevel gear 206 which serves to drive the gears 207 and 208 which, as illustrated, are bevel gears freely rotatable on a shaft 209 and, as indicated, will be driven in opposite directions of rotation. The gears 207 and 208 have inner hubs formed with clutch teeth so that either gear may engage to drive the double clutch member 210, and the shaft 209, to which it is slidably keyed. The clutch member 210 is shown in neutral or disengaged position but may be shifted to engage either of the gears to drive the shaft 209 in either direction by means of a clutch fork 211, which is carried on a rod 212 slidably mounted in the head and having a slotted block 213 in which slot a crank pin or roller 214 engages. The crank pin 214 extends from a short shaft 215 which is journaled in the face plate of the head and to which shaft is fixed the feed control lever 13.

By manual operation of the lever 13 the direction of feed or longitudinal movement of the spindle is controlled, and as will be understood by inspection of the diagram, when the lever is moved in a direction indicated by arrow K, the movement of the spindle 6 will be in the direction indicated by arrow L and vice versa.

The shaft 209 carries a worm 217 which drives a worm wheel 218, having integrally mounted for rotation therewith a bevel gear 219 which drives the bevel gear 220 and a shaft 221. The shaft 221 is journaled in the head and has affixed thereto a spur gear 222 which drives gear 223, shaft 224 and gear 225. The gear 225 drives a gear 226 on a shaft indicated at 227. From this point on the arrangement of the spindle feed members may be as described in detail in my co-pending application, Serial No. 435,699, previously mentioned. However, for completeness of the present description, the shaft 227, which corresponds to the shaft 40 of my co-pending application mentioned, terminates in a clutch jaw 228 and is normally engaged to an aligned shaft 229 by a double clutch element 230 which is slidably keyed to the shaft 229 and is normally urged to the position shown by a spring 231 acting on a shifting fork indicated at 232. Freely rotatable upon the shaft 229 a gear 233 has a hub with clutch teeth suitable for engagement with the sliding clutch element 230. By this arrangement the shaft 229 may be driven either by engagement with the shaft 227 or, by shifting of the clutch as may be readily accomplished by means of a solenoid 52A, by power of the motor C, which motor operates through gears 234 and 235 to drive shaft 236 which has a worm 237 engaging the gear 233. The motor C, as before explained, is used for rapid traverse of the spindle and is a reversible motor so that the rapid traverse of the spindle may be accomplished by suitably arranged forward and reverse push button stations.

As shown in Fig. 8, the shaft 229 operates through gears 240 and 241 to drive gears 242 and 243 in opposite directions of rotation, thus rotating the screws 244 and 245 in the directions indicated. The spindle movement is produced by these screws which are threaded in opposite directions and are engaged by nuts 246 and 247, the nuts being connected to a cross bar 248 to which cross bar is attached the rear end of the spindle assembly which rear end comprises a member indicated at 249. By a suitable means (not herein disclosed) the member 249 is attached to the rear end of the spindle indicated at 250, the juncture being such that the spindle may rotate freely but will be advanced or retracted longitudinally by movement of the member 249. This arrangement, as well as that of the oppositely rotating screws 244 and 245, together with the clutch 230, solenoid 52A and motor C, is fully described in my co-pending application, Serial No. 435,699, now U. S. Letters Patent No. 2,307,975, referred to herein.

With reference to Fig. 8, it may be pointed out that the angular relation of shafts 209 and 221, and of the various elements associated therewith, was adopted for purpose of illustration only, and that the actual arrangement of the shafts mentioned is in parallel planes.

Fig. 6 shows the detailed arrangement of the shaft 209; as here shown the shaft may be in two sections 209a and 209b normally held in driving engagement by a spring urged clutch member 251 slidably keyed to the portion 209a and engaging a similar clutch member 252 fixed to the portion 209b of the shaft. The worm 217 is integral with the portion 209b and will be normally driven by rotation of the portion 209a, but under conditions of overload the clutch elements 251 and 252 may disengage due to an inclined formation of their teeth and the resilient mounting of the member 251. Overload clutches such as this may be provided as desired in any of the drive trains, and will be obvious.

For purposes of adjusting the spindle by manual operation, the hand wheel 15 may be used. It will be apparent from Fig. 6, that when the clutch 210 is in neutral position, the hand wheel may be used to rotate the worm 217 for close manual adjustment of the spindle. The spider 14 may be used for more rapid manual adjustment of the spindle and forms no essential part of my present invention. The arrangement of the spider (not shown) is such that the bevel gear 219, which normally rotates in fixed relation with the large gear 218, may be disengaged from the gear 218 and turned by manual operation of the spider, to thus rotate the gear 220 and the train of mechanism driven thereby which effects movement of the spindle.

*Interlock mechanism*

It will be apparent that various interlock devices may be employed in conjunction with my invention. In Fig. 7, I have illustrated such a device. As here shown the control shafts 21 and 111 are provided with cam elements 300 and 301 which engage arms 302 and 303, extending from a slidably mounted bar 304. The bar may be spring urged to the position shown by a compression spring 305. It will be apparent that any rotation of the shaft 21, or of the shaft 111, which occurs when either the column drive or the head drive is engaged, will result in movement of the bar 304 to the left. This movement may be employed to close an electrical switch element 306 which may operate an electrical clutch or the like (not shown), associated with the feed drive shaft 128 to sever the driving connection to the spindle feed mechanism.

*Spindle drive*

As before mentioned the spindle 6 may be driven or rotated by an arrangement shown and described in my Patent No. 2,215,627. For purposes of the present disclosure the spindle is driven from the motor B which is carried on the head and controlled by push button stations embodied in the pendant switch 500. The motor B drives various change gears, the selection of which is determined by the levers 8, 9 and 10, and which train of gears terminates in a sleeve 400, journaled in the head. The spindle 6 is mounted within the sleeve but is slidably keyed therewith so that rotation of the sleeve is imparted to the spindle, while permitting the spindle to slide longitudinally, to and from the work, with respect to the sleeve.

*Pendant switch*

Referring to Figs. 9 and 10, the pendant switch 500 is of a type commonly employed in conjunction with machine tools, and has a plurality of push button stations for controlling various operations.

The push buttons 501, 502 and 503 control the main drive motor A. Button 501 controls rapid traverse of the column or head and when depressed closes a circuit to a relay or heavier motor switch which in turn closes a circuit to the motor A, to cause the motor to be energized. If the column or head drive gears are engaged, these members will thus be traversed. Upon releasing the button 501 the supply circuit of motor A will be immediately broken and the traversing movement of the members will cease, this occurring because the relay or heavier motor switch controlled by this botton is not provided with a holding coil or other device to maintain the motor supply circuit closed.

The button 502 actuates a second relay or motor switch, which closes a circuit to motor A, but in which circuit is a rheostat or resistance or other suitable means such as may be employed for driving the motor A at a greatly reduced rate of speed, the motor A being of a variable speed type. The button 502 therefore serves as a micrometer feed control, or jog station for either the column 3 or the head 5. The relay operated by this button has no holding coil and movement of the driven members ceases upon release of the button.

Arranged to be operated, if required, in conjunction with the button 502 is a reversing button or station 502A, seen at the top of the pendant switch. This button 502A may operate a relay or reversing switch in the circuit by motor A, said reversing switch being within the circuit controlled by button 502, so that both buttons must be depressed to operate the motor in reverse rotation. The reversing switch thus operated has no holding coil or other means to retain it in its reversing position, and upon release of the button 502A the normal forward drive circuit will be immediately restored to the motor. By this arrangement both buttons 502 and 502A must be depressed to operate the motor in reverse rotation. The mode of operation will be to hold button 502A in depressed position, while punching the button 502 to jog the part to required position.

The button 503 actuates a third relay in the circuit of motor A to provide automatic or constant feed to the column or head. This relay has a holding coil or other magnetic means to retain the relay and the motor circuit controlled thereby in closed position, after the button has been released. In this circuit is a rheostat or other suitable means for adjusting the speed of motor A to provide a desired rate of feed. To release this relay, as must occur before the feeding action may be halted, the circuit to the said holding coil must be broken. For this purpose there is provided a switch element controlled by the lever 504, actuation of the lever causing the circuit to be broken and halting the feeding operation.

The button 505 actuates a relay which closes a circuit to motor B. This relay has a holding coil so that when the button is released, the motor continues to operate. The motor B, as previously described, drives the spindle 6 which will continue to operate until the motor circuit is broken by actuation of the lever 504, which lever operates a switch element to break the circuit to the holding coil of the relay involved.

The button 506 also operates a relay to close the circuit to motor B, but this relay has no holding coil and the button therefore serves as a means for jogging the spindle in forward rotation.

By use of the button 507 the spindle may be jogged in reverse rotation, this button operating a reversing switch and closing the circuit to motor B causes the motor and other members driven thereby to rotate in reverse direction.

The buttons 508 and 509 are the rapid traverse buttons for moving the spindle in or out, or to and from the work. Either of the buttons when depressed actuate the solenoid 52A, before described, which shifts the clutch 230 contained within the feed ram housing. This clutch, as before explained, disengages the normal spindle feed drive from motor A and engaged the drive members to the rapid traverse motor C, which motor is also energized by means of a suitable relay when either of the buttons 508 or 509 are depressed. The button 509 operates also a reversing switch in the motor circuit, so that when this button is depressed the rotation of the motor, and consequently the traverse of the spindle, occurs in reverse direction. By this arrangement the button 508 operates to rapid traverse the spindle in one direction, and the button 509 operates to traverse the spindle in the opposite direction.

Having thus described my invention, what I claim as new and desire to secure by Letters Patent is:

In a machine tool of the character described, a table upon which work may be clamped, a bed, a column slidable along said bed, a head slidable along said column in a direction opposed to the direction of the sliding movements of said column on said bed, a spindle rotatably mounted in said head and mounted also for axial movements therein, a first source of power, drives in connection with said power source for moving said column along said bed, said head along said column and said spindle axially in said head, clutch means in connection with said drives for rendering said drives effective in alternative directions, settable means for said clutch arrangements located on said head and settable for said alternative movements and to neutral positions, interlock means in connection with certain at least of said clutch arrangements to prevent simultaneous actuation of certain of said drives, a second source of power for rotating said spindle, a switch assembly in the form of a pendant suspended by a bracket from said column in a position adjacent work on said table, said switch assembly including a switch for operating said first power source, and a switch for operating said second power source, each of said switches requiring continuous actuation to maintain energization of said power source, said switch assembly also including switches requiring continuous actuation for reversing said power sources, and further switches for energizing each of said power sources, said last mentioned switches having holding circuits to permit indefinite operation, and yet another switch means whereby said holding circuits may be simultaneously broken, and a third source of power in said head for rapid traverse axial movement of the spindle, a clutch arrangement for selectively connecting the last mentioned power source and the first mentioned power source with the spindle, automatically acting means for operating said clutch arrangement upon energization of said third power source, and switch means in connection with said switch assembly for actuating said third power source selectively in different directions.

JOHN M. WALTER.